235-379
2/28/84 OR 4,434,359

United States Patent [19]

Watanabe

[11] 4,434,359

[45] Feb. 28, 1984

[54] AUTOMATIC BANK NOTE TRANSACTION APPARATUS

[75] Inventor: Yoshihiro Watanabe, Fujisawa, Japan

[73] Assignee: Tokyo Shibaura Denki Kabushiki Kaisha, Kawasaki, Japan

[21] Appl. No.: 395,311

[22] Filed: Jul. 6, 1982

[30] Foreign Application Priority Data

Jul. 10, 1981 [JP] Japan ................................ 56-107683

[51] Int. Cl.[3] ............................................... G06F 15/30

[52] U.S. Cl. ......................................... 235/379; 271/9; 271/315; 271/187; 194/DIG. 26; 235/380; 235/381

[58] Field of Search ............... 235/379, 381, 383, 385; 221/287; 232/4 R; 109/22, 49, 53; 194/DIG. 9, DIG. 26; 271/9, 315, 187, 162, 164

[56] References Cited

U.S. PATENT DOCUMENTS 3,697,729 10/1972 Edwards ..................... 194/DIG. 26
4,282,424 8/1981 Hirose ................................ 235/379
4,369,360 1/1983 Tsuji .................................. 235/379

*Primary Examiner*—G. Z. Rubinson
*Assistant Examiner*—Robert Lev
*Attorney, Agent, or Firm*—Cushman, Darby & Cushman

[57] ABSTRACT

An automatic bank note transaction apparatus comprises a first unit detachably mounted in a housing and including safes disposed at one side thereof and a second unit provided in the housing, adjacent to and detachably mounted on the first unit and connected to a bank note dispensing port of the housing. Since the first unit can be turned back to front with respect to the second unit, the most suitable operating mode, that is, a front-operation mode or a rear-operation mode, can be arbitrarily set in accordance with the installation position of the apparatus. Therefore, the bank can install and deploy the apparatus in any location, resulting in low cost and convenience.

5 Claims, 7 Drawing Figures

AUTOMATIC BANK NOTE TRANSACTION APPARATUS

BACKGROUND OF THE INVENTION

The present invention relates to an automatic bank note transaction apparatus such as an automatic bank note withdrawal device or an automatic bank note deposit/withdrawal apparatus, and more particularly, to an automatic bank note transaction apparatus having a withdrawal function.

Two types of automatic bank note withdrawal apparatus are generally available, allowing the performance of maintenance operations of bank note compartments, in accordance with their installation locations. One is the type in which the maintenance operations are performed from the front side of the apparatus, while the other is the type in which the operations are performed from the rear side of the apparatus. For example, if the apparatus is installed near an inside wall of a building, the former type of the apparatus must be installed for convenience. However, if the apparatus is installed between the inside of the bank and customers, the latter type of the apparatus may be installed.

The bank note dispensing compartments and bank note conveyance systems are provided in a housing dedicated to either the front-operating or rear-operating type. Therefore, if an apparatus of the front-operating type is relocated to a place where the rear-operating type is more suitably installed, a new apparatus of the rear-operating type must be replaced with the apparatus of front-operating type, resulting in an economical disadvantage.

SUMMARY OF THE INVENTION

The present invention has been made to solve the above problem and has for its object to provide an automatic bank note transaction apparatus which can be readily modified from a front-operating type to a rear-operating type and vice versa.

According to an aspect of the present invention, there is provided an automatic bank note transaction apparatus comprising: a housing having a bank note dispensing port and a front door at a front side thereof and a rear door at a rear side thereof; a first mechanism detachably mounted in the housing through the rear door; and a second mechanism provided in the housing, adjacent to and detachably mounted on the first mechanism and connected to the bank note dispensing port, the first mechanism including: safe means disposed at one side of the first mechanism for taking out the bank notes therefrom; transferring means for transferring the bank notes taken out of the safe means; and first conveying means disposed between the safe means and the transferring means for transferring the bank notes taken out of the safe means to the transferring means, the first mechanism being reversible relative to the second mechanism between a first position at which the safe means is near the rear door and a second position at which the safe means is near the front door and the second mechanism including: receiving means opposing the transferring means, for receiving the bank notes from the transferring means; and second conveying means disposed between the receiving means and the bank note dispensing port, for conveying the bank notes received in the receiving means to the bank note dispensing port whereby at the first position a maintenance operation for the safe means is performed in a condition where the rear door is opened, and at the second position the maintenance operation is performed in a condition where the front door is opened.

DETAILED DESCRIPTION OF THE PREFERRED EMBODIMENT

One embodiment of an automatic bank note transaction apparatus according to the present invention will be described with reference to the accompanying drawings.

Figure 1:
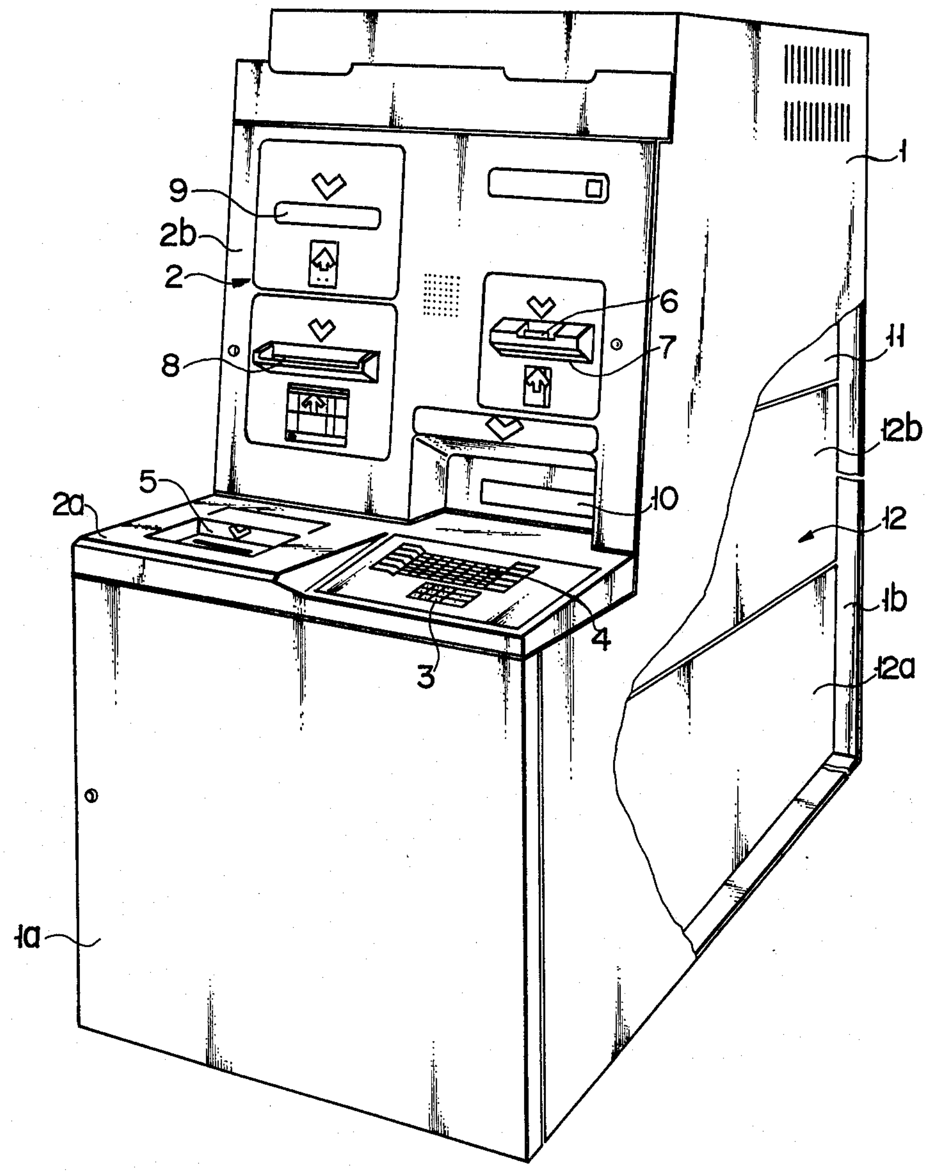
FIG. 1 is a partially cutaway perspective view of one embodiment of an automatic bank note transaction apparatus according to the present invention.

Referring to FIG. 1, reference numeral 1 denotes a housing of an automatic deposit/withdrawal apparatus as the automatic bank note transaction apparatus. A customer operation part 2 is disposed at the front of the housing 1. The customer operation part 2 has a horizontal operation panel 2a disposed substantially half-way down the front side and a vertical operation panel 2b arising vertically from the rear edge of the horizontal operation panel 2a.

A keyboard 3, a CRT display 4 for displaying information, and a port 5 which functions as both an insertion port and a dispensing port are arranged on the horizontal operation panel 2a. An ID card insertion port 6, a slip discharging port 7, a passbook insertion port 8, an envelope insertion port 9 and bank note dispensing port 10 are arranged on the vertical operation panel 2b.

In the housing 1 are arranged: a unit 11 (not shown in detail) having a card reader which reads information from an ID card inserted through the ID card insertion port 6 and a slip issuing unit which conveys to the slip port 7 a slip on which transaction details are printed; a passbook reader/printer (not shown) which reads information from a magnetic strips on a passbook inserted through the passbook insertion port 8 and which records the transaction details on the passbook; an envelope processing unit (not shown) which prints predetermined characters on an envelope inserted through the envelope insertion port 9; a bank note deposit mechanism which transacts deposits of bank notes P inserted through the port 5; and a bank note dispensing mechanism 12 which dispenses at the bank note dispensing port 10 the bank notes P specified by a customer.

Figure 2:
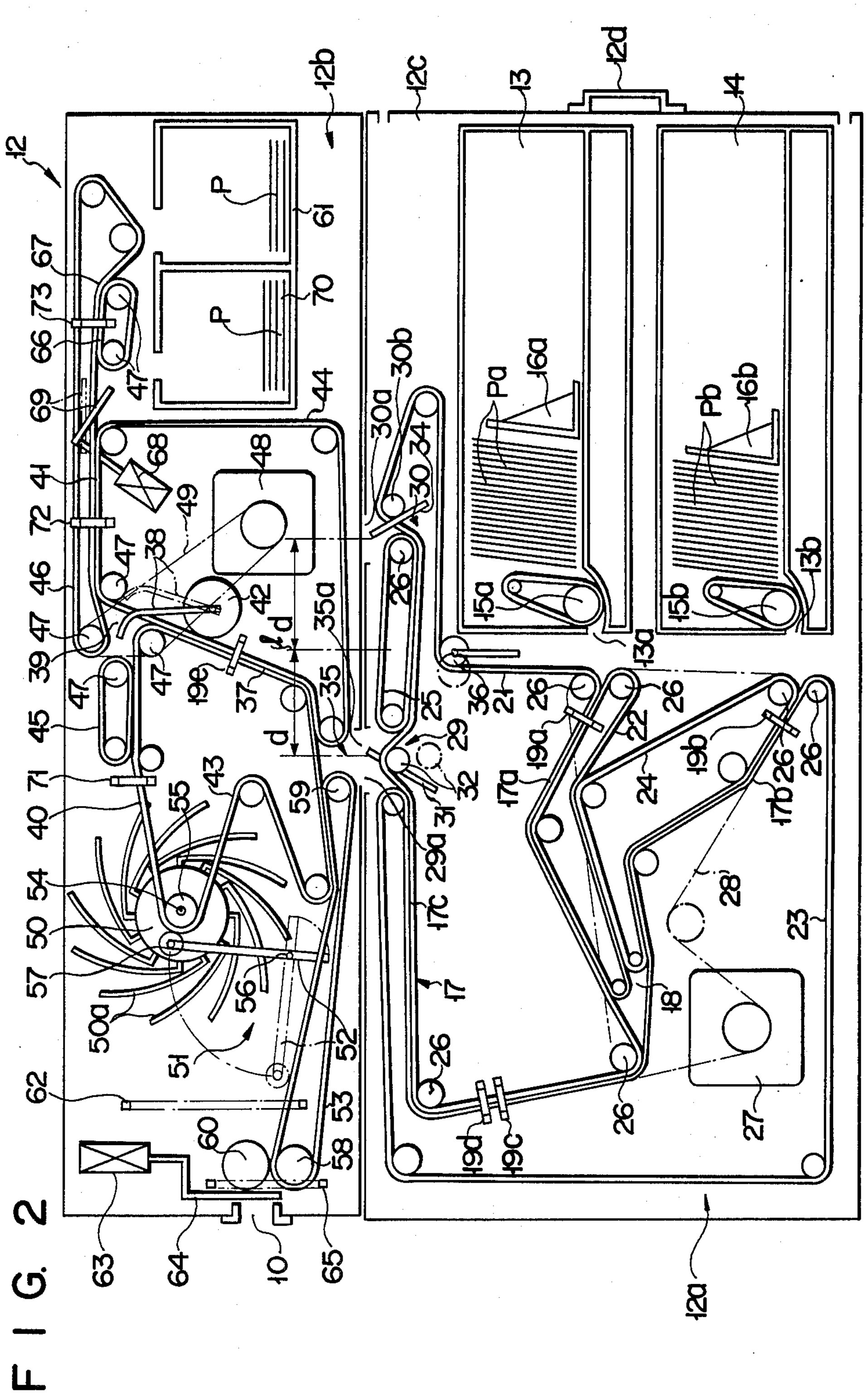
FIG. 2 is a side view schematically showing the internal arrangement of a bank note dispensing mechanism when the automatic bank note transaction apparatus in FIG. 1 is of the rear-operating type.
Figure 5:
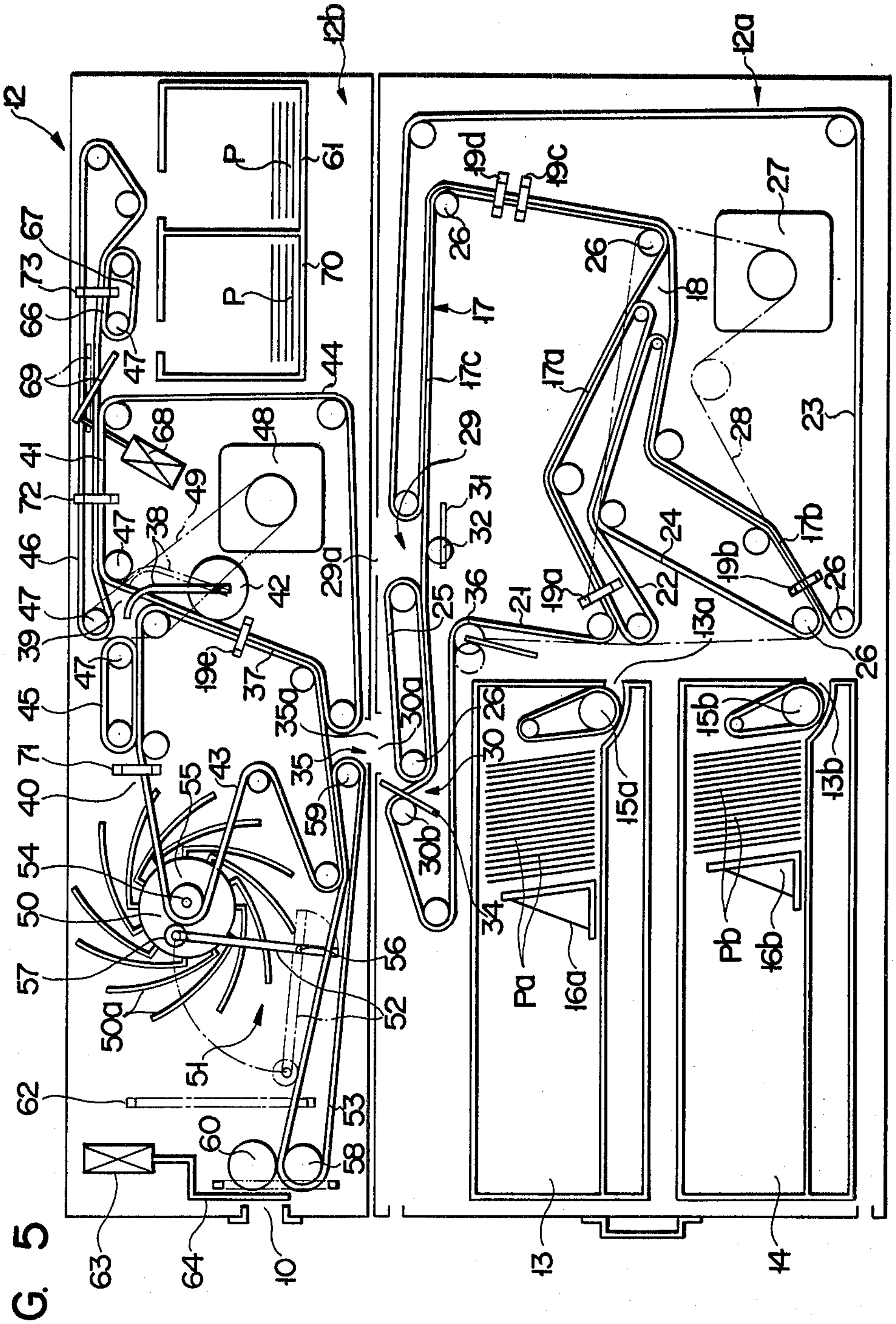
FIG. 5 is a side view schematically showing the internal arrangement of the bank note dispensing mechanism when the automatic bank note transaction apparatus in FIG. 1 is of the front-operating type.

The bank note dispensing mechanism 12 has a first unit 12a and a second unit 12b which are vertically divided, as shown in FIGS. 2 and 5. The first unit 12*a* disposed under the second unit 12*b* has first and second bank note dispensing compartments 13 and 14. The first unit 12*a* can be rotated through 180° with respect to the second unit 12*b* during installation. The bank note dispensing mechanism 12 is detachably provided in the housing 1, while the first unit 12*a* is detachably mounted to the second unit 12*b* by means of a fixing mechanism (not shown). A front opening of the housing 1 for allowing mounting/dismounting of first and/or second bank note dispensing compartment 13 and/or 14 in the first unit 12*a* from the front is formed at a portion of the front side of the housing 1 opposing one end face of the first unit 12*a*. This front opening is free to open and close through a front door 1*a*. A rear opening for allowing mounting/dismounting of the bank note dispensing mechanism 12 from the rear is formed at a portion of the rear side of the housing 1 opposing the other end face of the bank note dispensing mechanism 12. This rear opening is free to open and close through a rear door 1*b*. With the above arrangement, maintenance of both first and second bank note dispensing compartments 13 and 14 can be performed through either the front door 1*a* or the rear door 1*b* of the housing 1.

The first and second units 12*a* and 12*b* will be described with reference to FIG. 2 wherein maintenance of the bank note dispensing compartments 13 and 14 is performed from the rear door 1*b* of the housing 1. The first unit 12*a* has the first and second bank note dispensing compartments 13 and 14 which are vertically arranged therein at the rear side (right side in FIG. 2). First denomination notes Pa (e.g., 10-dollar notes or 1-pound notes) are stored in the first bank note dispensing compartment 13 which is located above the second bank note dispensing compartment 14. Second denomination notes Pb (e.g., 100-dollar notes or 10-pound notes) are stored in the second bank note dispensing compartment 14. Pickup mechanisms 15*a* and 15*b* and backup mechanisms 16*a* and 16*b* are mounted in the first and second bank note dispensing compartments 13 and 14, respectively. The pickup mechanisms 15*a* and 15*b* take out bank notes Pa and Pb, respectively, while the backup mechanisms 16*a* and 16*b* urge the bank notes Pa and Pb toward the pickup mechanisms 15*a* and 16*b*, respectively. Therefore, the first denomination note Pa or the second denomination note Pb is selectively taken out one by one through a first takeout port 13*a* or a second takeout port 13*b*.

A door 12*c* is mounted on the rear end face (FIG. 2) of the first unit 12*a* so that the rear end face is free to open. A handle 12*d* is mounted substantially at the center of the door 12*c*. The first and second bank note dispensing compartments 13 and 14 can be dismounted once the door 12*c* is opened.

First conveying passages 17 are located at the front part (left side in FIG. 2) of the first unit 12*a* to convey to the second unit 12*b* the first and/or second denomination note Pa and/or Pb which is selectively taken out from the first and second bank note dispensing compartments 13 and 14. The first conveying passages 17 comprise a first denomination note conveying passage 17*a* which conveys the first denomination note Pa taken out of the first bank note dispensing compartment 13, a second denomination note conveying passage 17*b* which conveys the second denomination note Pb taken out of the second bank note dispensing compartment 14, and a common conveying passage 17*c* which continuously conveys the first denomination note Pa and/or the second denomination note Pb which is conveyed by the conveying passage 17*a* or 17*b*.

The conveying passage 17*a* is disposed between the first takeout port 13*a* and an intermediate transferring station 18, and is defined between the opposing surfaces of a pair of first belts 21 and a pair of second belts 22 (one of the pair of first or second belts is only illustrated in FIG. 2). The pair of first belts 21 is endlessly looped along the first takeout port 13*a*, the intermediate transferring station 18, a first transferring station 29 to be described later, and a second transferring station 30 to be described later. The pair of second belts 22 is endlessly looped between the first takeout port 13*a* and the intermediate transferring station 18. A first counter 19*a* for counting the number of the first denomination notes Pa taken out of the first bank note dispensing compartment 13 is arranged at the conveying passage 17*a*.

The conveying passage 17*b* is formed between the second takeout port 13*b* and the intermediate transferring station 18 and is defined by the opposing surfaces of a pair of third belts 23 and a pair of fourth belts 24. The pair of third belts 23 is endlessly looped along the second takeout port 13*b*, the intermediate station 18 and the first transferring station 29. The pair of fourth belts 24 is endlessly looped along the second takeout port 13*b* and the intermediate transferring station 18. A second counter 19*b* for counting the number of second denomination notes Pb taken out of the second bank note dispensing compartment 14 is arranged at the conveying passage 17*b*.

The common conveying passage 17*c* is formed between the intermediate transferring station 18 and the second transferring station 30 through the first transferring station 29. The common conveying passage 17*c* is defined by the opposing surfaces of the pair of first belts 21 and the pair of third belts 23 and the opposing surfaces of the pair of first belts 21 and a pair of fifth belts 25. The pair of fifth belts 25 is endlessly looped between the first transferring station 29 and the second transferring station 30. A note-overlap detector 19*c* and a discriminator 19*d* for discriminating between first and second denomination notes Pa and Pb are arranged at the common conveying passage 17*c* along the conveying direction in the order named.

Each pair of belts 21, 22, 23, 24 and 25 is driven by at least one drive roller 26. Each drive roller 26 is driven by a motor 27 as the first driving source through a power transmission system 28, so that each pair of belts 21, 22, 23, 24 and 25 is driven in each predetermined direction.

The first transferring station 29 includes a first opening 29*a* formed on that portion of the upper part of the first unit 12*a* which is shifted by a predetermined distance d to the left (FIG. 2) from a central line (indicated by reference symbol l) of the first unit 12*a*; a movable roller 32 which is rotatably in contact with those portions of the lower surfaces of the pair of first belts 21 which are located below the first opening 29*a*; and a first guide plate 31 which obliquely crosses those portions of the pair of first belts 21 which are located below the first opening 29*a*. As shown in FIG. 2, where the first and second bank note dispensing compartments 13 and 14 are located in the rear side, the movable roller 32 is moved to a first position to urge those portions of the pair of first belts 21 upward which contact with the movable roller 32. However, as shown in FIG. 5, where the first and second bank note dispensing compartments 13 and 14 are located in the front side, the movable roller 32 is brought into a second position so as not to urge those portions of the pair of first belts 21 upward. When the movable roller 32 is kept at the first position, the first guide plate 31 is moved to a third position to obliquely cross the pair of first belts 21. However, when the movable roller 32 is located in the second position, the first guide plate 31 is brought into a fourth position so as not to cross the pair of first belts 21. Note that a tension roller 36 as one of the rollers supporting the pair of first belts 21 is brought into a fifth position (outward) by the tension of the pair of first belts 21 when the movable roller is kept in the first position, and that the tension roller 36 is brought into a sixth position (inward) to maintain predetermined tension of the pair of first belts 21 when the movable roller 32 is kept in the second position.

The second transferring station 30 includes a first opening 30*a* formed on that portion of the upper part of the first unit 12*a* which is shifted by the predetermined distance d to the right (FIG. 2) from the central line l, a stationary roller 30*b* which is rotatably in contact with those portions of the lower surfaces of part of the pair of first belts 21 which are located below the second opening 30*a* and are defined to oblique upward, and a second guide plate 34 which obliquely crosses those portions of the pair of first belts 21.

Since the first and second transferring stations 29 and 30 are arranged in a manner as described above, the movable roller 32, the first guide plate 31 and the tension roller 36 are respectively located in the first, third and fifth positions when the first and second bank note dispensing compartments 13 and 14 are located in the rear side as shown in FIG. 2. In this condition, the first or second denomination notes Pa or Pb conveyed on the common conveying passage 17*c* of the conveying passages 17 are taken out of the first unit 12*a* at the first transferring station 29 by the first guide plate 31 through the first opening 29*a*. On the other hand, where the first and second bank note dispensing compartments 13 and 14 are located in the front side, as shown in FIG. 5, the movable roller 32, the first guide plate 31 and the tension roller 36 are respectively located in the second, fourth and sixth positions. In this condition, the first or second denomination notes Pa or Pb conveyed on the common conveying passage 17*c* pass through the first transferring station 29 and are taken out of the first unit 12*a* at the second transferring station 30 by the second guide plate 34 through the second opening 30*a*.

The second unit 12*b* is arranged in the following manner. A bank note reception station 35 is formed at that portion of the under part of the second unit 12*b* which is shifted by the predetermined distance d from the central line l. The bank note reception station 35 has a third opening 35*a* at that portion of the bottom plate of the second unit 12*b* which is located immediately therebelow. In other words, in the state as shown in FIG. 2, the third opening 35*a* of the bank note reception station 35 opposes the first opening 29*a* of the first transferring station 29. Therefore, the first and/or second denomination notes Pa and/or Pb taken out through the first opening 29*a* are received in the bank note reception station 35 of the second unit 12*b* through the third opening 35. However, in the state as shown in FIG. 5, the third opening 35*a* opposes the second opening 30*a* of the second transferring station 30. Therefore, the first and/or second denomination notes Pa and/or Pb taken out through the second opening 30*a* are received in the bank note reception station 35 through the third opening 35*a*.

A conveying passage 37 for raising the first or second denomination notes Pa or Pb received in the bank note reception portion 35 is formed substantially at the center of the second unit 12*b*.

The conveying passage 37 is formed between the bank note reception station 35 and a branch station 39 located thereabove. The conveying passage 37 is defined by the opposing surfaces of a pair of sixth belts 43 and a pair of seventh belts 44. The pair of sixth belts 43 is endlessly looped along the bank note reception station 35, the branch station 39, impellers 50 to be described later, and a temporary stacker 51. The pair of seventh belts 44 is endlessly looped along the bank note reception station 35, the branch station 39 and a rejected bank note compartment 70.

A first sorting gate 38 is disposed at the branch station 39 of the conveying passage 37. The first sorting gate 38 is operated by a gate actuator 42 which has a rotary solenoid. A bank note detector 19*e* is arranged at the middle of the conveying passage 37 to determine that the first or second denomination note Pa or Pb reaches thereat. Based on the detection results by the bank note detectors 19*c* and 19*d*, the gate actuator 42 causes the first sorting gate 38 to selectively transfer a proper bank note to a proper bank note conveying passage 40 and an rejected or recovered note to an rejected bank note conveying passage 41.

The proper bank note conveying passage 40 is disposed between the branch station 39 and the impellers 50 and is defined by the opposing surfaces of the pair of sixth belts 43 and a pair of eighth belts 45, and by the slant surfaces of the pair of sixth belts 43 adjacent to the opposing surfaces. The pair of eighth belts is endlessly looped along the branch station 39 and an intermediate portion between the impellers 50 and the branch station 39.

The rejected bank note conveying passage 41 is defined between the branch station 39 and a rejected bank note compartment 70. This conveying passage 41 is defined by the opposing surfaces of the pair of seventh conveyer belts 44 and a pair of ninth belts 46. The pair of ninth belts 46 is endlessly looped along the branch station 39, the rejected bank note compartment 70 and a recovered bank note compartment 61. A recovered bank note conveying passage 66 which is adjacent to the rejected bank note conveying passage 41 is defined between the rejected bank note compartment 70 and the recovered bank note compartment 61. The recovered bank note conveying passage 66 is defined by the opposing surfaces of the pair of ninth belts 46 and a pair of tenth belts 67. The pair of tenth belts 67 is endlessly looped between the rejected bank note compartment 70 and the recovered bank note compartment 61.

A second sorting gate 69 is disposed at the terminal end of the rejected bank note conveying passage 41. The second sorting gate 69 is activated by a gate actuator 68 which has a solenoid. If a bank note which reaches the terminal end of the conveying passage 41 is a rejected one, the actuator 68 causes the second sorting gate 69 to cross the pair of ninth belts 46 and to store the rejected bank note in the rejected bank note compartment 70. However, if a recovered bank note reaches the terminal end of the conveying passage 41, the actuator 68 causes the second sorting gate 69 not to cross the pair of ninth belts 46 so that the bank note is transferred to the recovered bank note conveying passage 66 and is automatically stored in the recovered bank note compartment 61.

Each pair of belts 43, 44, 45, 46 and 47 is driven by at least one drive roller 47. Each drive roller 47 is driven by a motor as a second driving source through the power transmission system 28 so that each pair of belts 43, 44, 45, 46 and 47 is driven in a predetermined direction, respectively.

Assume that one of bank notes P fails to reach the port 10 after a customer's account has been reduced by the equivalent amount. Further, suppose a customer leaves, by mistake, one of bank notes P fed to the port 10. In either case the bank note P is stored into the recovered bank note compartment 61. The recovered bank note does not belong to the bank, but to the customer. The bank temporarily keeps it for the customer. On the other hand, assume that one of the bank note P fails to reach the port 10 after a customer's account has been reduced by the equivalent amount. For example, when two overlapped bank notes P are taken out simultaneously the two overlapped bank notes P should not be handed to the customer as the rejected bank notes. Thus, this bank note as the rejected bank note belongs to the bank and must be stored in the rejected bank note compartment 70. The rejected bank note is then recirculated as a bank note.

Figure 3:
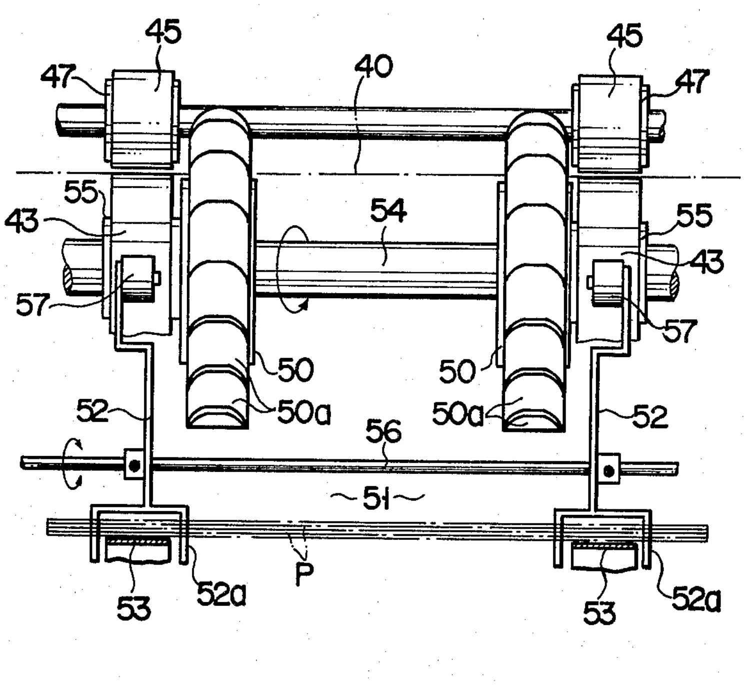
FIG. 3 is a front view showing an impeller and a temporary stacker.

The pair of impellers 50 is rotatably disposed at the terminal end of the proper bank note conveying passage 40 for proper bank notes, as shown in FIG. 3. The proper bank note conveyed by the conveying passage 40 is held between a pair of adjacent blades among a plurality of blades 50*a* mounted on each impeller 50. Upon rotation of the impellers 50, the bank note is conveyed to the temporary stacker 51. In the temporary stacker 51, the bank note P is then taken out of the impeller 50 by a pair of separation stoppers 52. The bank notes P are stacked on a pair of conveyer belts 53 which define the bottom surface of the temporary stacker 51 and which are used to dispense/recover the bank notes.

The impellers 50 are mounted on a common rotating shaft 54. Rollers 55 are mounted at both ends of the rotating shaft 54. The sixth conveyer belts 43 are mounted on the rollers 55, respectively. The separation stoppers 52 are mounted on a driving shaft 56 which is rotated through a predetermined angle by a driving source (not shown). For stacking the bank notes, as indicated by the solid line in FIG. 2, press rollers 57 which are rotatably mounted at the distal ends of the separation stoppers 52 rotatably contact with those portions if the pair of sixth conveyer belts 43 which are mounted on the rollers 55, respectively, and the press rollers 57 cross the impellers 50. Therefore, the bank notes P conveyed to the temporary stacker 51 by the separation stoppers 52 are kept thereat. Further, for taking out the stacked bank notes from the temporary stacker 51, the separation stoppers 52 are pivoted in the position as indicated by the alternate two dots and dash line in FIG. 4, so that the bank notes are held on the conveyer belts 53 through the press rollers 57. The separation stoppers 52 act as press members for taking out the stacked bank notes P at one time.

Figure 4:
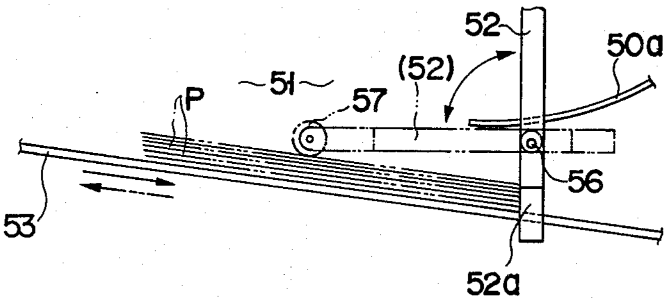
FIG. 4 is a side view showing a separation stopper.

As shown in FIGS. 3 and 4, when the bank notes are temporarily stacked, lower ends 52*a* of the separation stoppers 52 are fitted around the upper and side surfaces respectively of the conveyer belts 53. Therefore, if the conveyer belts 53 are driven in the reverse direction indicated by the solid arrow in FIG. 4, trailing ends of the stacked bank notes can be aligned.

The pair of conveyer belts 53 is endlessly looped between a roller 58 located near the bank note dispensing port 10 and a roller 59 located near the bank note reception station 35. A pinch roller 60 is located on the upper surface portions of the conveyer belts 53 at the side of the bank note dispensing port 10. The pair of sixth belts 43 respectively are in tight contact with those portions of the upper surfaces of the conveyer belts 53 which are located at the bank note reception station 35 side.

The bank notes P stacked in the temporary stacker 51 are compressed by the separation stoppers 52 and fed by the conveyer belts 53 either in the dispensing direction indicated by the broken arrow in FIG. 4 or in the recovery direction indicated by the solid arrow in FIG. 4. The bank notes P are thus taken out at the bank note dispensing port 10 or are stored in the recovered bank note compartment 61.

A bank note detector 62 for detecting the trailing ends of those bank notes P to be dispensed at the bank note dispensing port 10 is arranged between the pinch roller 60 and the temporary stacker 51 to check whether or not the trailing ends of the bank notes P cross the detector 62. When the detector 62 detects the trailing ends of the bank notes P, the running of the conveyer belts 53 is stopped so that the bank notes P conveyed to the port 10 is not dropped from the conveyer belts 53. Further, a shutter 64 selectively opened by a shutter actuator 63 of the plunger type magnet or the like is arranged between the bank note dispensing port 10 and the pinch roller 60. A bank note detector 65 is arranged behind the shutter 64.

If a customer forgets to take out the bank notes P dispensed at the bank note dispensing port 10, or if two overlapped bank notes are erroneously stacked in the temporary stacker 51, the bank notes are conveyed through the conveying passage 66 respectively to either the recovered bank note compartment 61 or the rejected bank note compartment 70 which are mounted at the rear portion of the second unit 12*b*. The conveying passage 66 is constituted by the upper surfaces of the conveyer belts 53 and the conveying passages 37, 41 and 66.

A counter 71 is arranged at the middle of the conveying passage 40 and a counter 72 is arranged at the middle of the conveying passage 41. The counters 71 and 72 count the number of proper bank notes and the number of rejected and recovered bank notes, respectively.

A bank note detector 73 is arranged at the terminal end of the conveying passage 66 to check whether the bank note to be recovered is properly conveyed into the recovered bank note compartment 61.

The operation of the automatic bank note insertion/-dispensing apparatus with the above arrangement will be described.

If the apparatus is installed between the customer hall and the staff office of the bank, the front side of the apparatus faces the customers and the apparatus is used as the rear-operating type as shown in FIG. 2. The first and second denomination notes Pa and Pb are selectively taken out of the first and second bank note dispensing compartments 13 and 14 through the pickup mechanisms 15*a* and 15*b*, respectively. The bank notes Pa and/or Pb then pass through the common conveying passage 17*c* and are detected by the note-overlap detector 19*c* as to whether or not two overlapped bank notes are present. The bank notes Pa and/or Pb are further conveyed to the first transferring station 29 and then to the second unit **12*b* through the first opening 29*a* and the third opening 35*a***.

The first and/or second denomination notes Pa and-/or Pb sequentially conveyed in the second unit **12*b* are fed to the conveying passage 37 from the bank note reception station 35. The leading ends of the bank notes are detected by the bank note detector 19*e*, if the proper bank notes are detected, the first sorting gate 38 is pivoted counterclockwise (left side in FIG. 2) and they are conveyed along the conveying passage 40. The bank notes Pa and/or Pb are then conveyed to the temporary stacker 51 through the impellers 50 and leave the impellers 50 when the end faces of the bank notes Pa and/or Pb abut against the separation stoppers 52. Thus, the bank notes Pa and/or Pb drop onto the temporary stacker 51 and are then stacked on the conveyer belts 53. During this stacking operation, since the lower ends 52*a* of the separation stoppers 52 are fitted around the upper and side surfaces of the conveyer belts 53**, trailing ends of the bank notes are well-aligned.

As described above, the bank notes P corresponding to a predetermined amount are taken out of the first and second bank note dispensing compartments 13 and 14. Any two overlapped bank notes are eliminated. Further, if the count of the counter 71 corresponds to the predetermined amount, the conveyer belts 53 are temporarily stopped and the impellers 50 are also stopped in response to the interruption of travel of the conveyer belts 53.

Thereafter, upon rotation of the separation stoppers 52, the temporarily stacked bank notes in the temporary stacker 51 are pressed onto the belts 53. The conveyer belts 53 start travelling in the dispensing direction. As a result, the bank notes P stacked in the temporary stacker 51 are collectively conveyed to the bank note dispensing port 10.

When the leading ends of the bank notes P are detected by the bank note detector 65, the shutter 64 is opened by the shutter actuator 63. Subsequently, when the trailing ends of the bank notes P are detected by the bank note detector 62, the conveying operation is interrupted. The leading ends of the bank notes P extend through the bank note dispensing port 10, while the trailing ends thereof are clamped between the conveyer belts 53 and the pinch roller 60. Thus, the customer can receive the predetermined amount of money. The thick solid lines in FIG. 6 indicate the conveying route of the proper bank notes.

Figure 6:
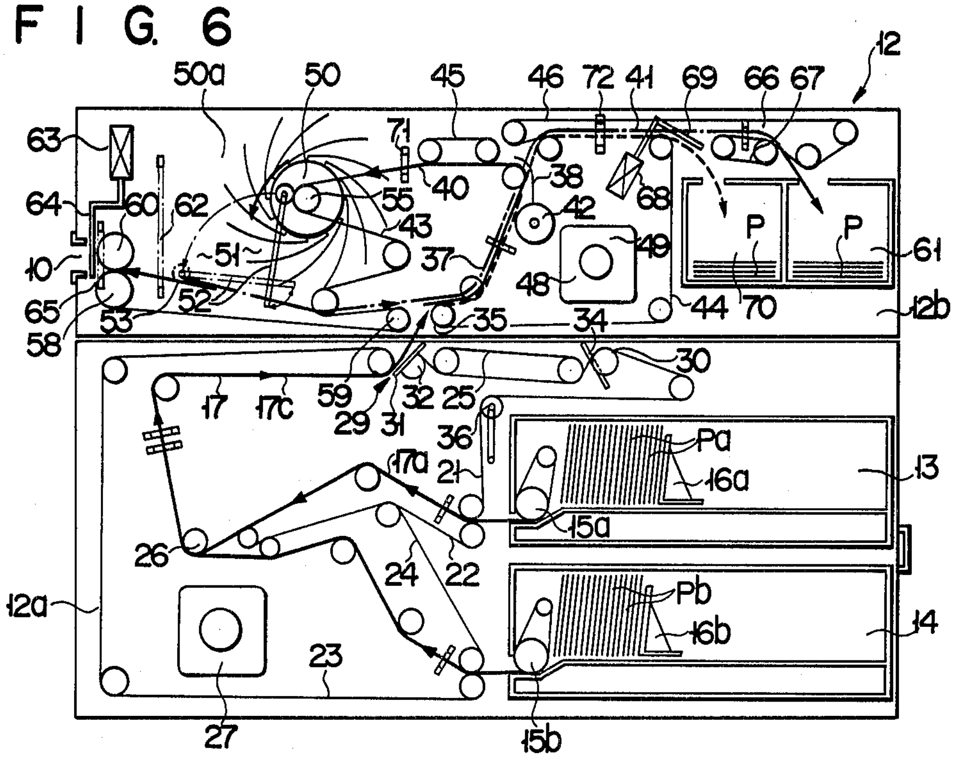
FIG. 6 is a side view showing bank note dispensing passages when the apparatus used is of the rear-operating type.
Figure 7:
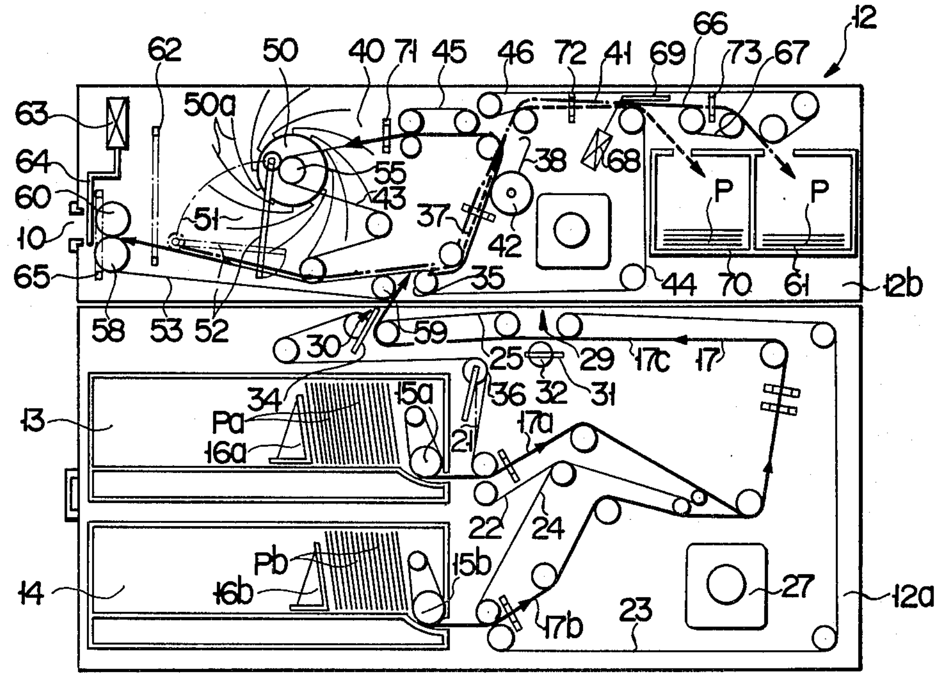
FIG. 7 is a side view showing bank note dispensing passages when the apparatus used is of the front-operating type.

However, if the bank notes being conveyed to the second unit **12*b* are detected as overlapped bank notes by the detector 19*c*, the first sorting gate 38 is pivoted clockwise as shown in FIG. 7 and the bank notes are conveyed on the conveying passage 41. The rejected bank notes are then stored in the rejected bank note compartment 70 through the second sorting gate 69. If this occurs, first and/or second bank notes Pa and/or Pb corresponding to the short fall against the amount specified by the customer are taken out of the first bank note dispensing compartment 13 and/or the second bank note dispensing compartment 14. Thus, bank notes which correspond to the specified amount of money are stacked in the temporary stacker 51. The thick broken lines in FIG. 6** indicate the conveying route of the rejected bank notes.

Further, if the customer does not take out the proper bank notes dispensed at the bank note dispensing port 10 within 30 seconds, and the bank note detector 65 is not turned off, a timer (not shown) generates a signal to maintain the separation stoppers 52 in the position indicated by the solid line. Thus, the stopper function of the separation stoppers 52 is initiated. The motor 48 is then driven in the reverse direction to drive the conveyer belts 53 in the recovery direction as indicated by the solid arrow in FIG. 4. The dispensed bank notes are fed back from the bank note dispensing port 10 as recovered bank notes. When the bank note detector 65 is turned off, the shutter 64 is closed.

The recovered bank notes fed back into the temporary stacker 51 come in contact with the separation stoppers 52 so that the leading ends thereof are well-aligned. When the alignment of the bank notes is completed, the separation stoppers 52 are pivoted to a position indicated by the one dot and dash line. The press rollers 57 mounted at the distal ends of the separation stoppers respectively urge the bank notes toward the conveyer belts 53. The lower ends **52*a* of the separation stoppers 52 which are fitted around the upper and side surfaces of the conveyer belts 53 respectively are released so that the bank notes P stacked in the temporary stacker 51 are collectively conveyed into the conveying passage 41. Since the second sorting gate 69 is kept in the open position by the detection signal from the counter 72, the bank notes pass through the conveying passage 66 and are recovered into the recovered bank note compartment 61. The thick one dot and dash line indicates the conveying route of the bank notes to be recovered, as shown in FIGS. 6 and 7**.

If the bank notes to be stored in the rejected bank note compartment 70 are erroneously stacked in the temporary stacker 51, they can be recovered in the same manner as the recovered bank notes. However, in this case, the second sorting gate 69 is closed, so that the bank notes are not conveyed into the conveying passage 66 but into the conveying passage 41. Thereafter, the rejected bank notes are stored in the rejected bank note compartment 70.

The bank note dispensing operation is performed as described above, and the number of bank notes Pa and Pb decreases. The first and second bank note dispensing compartments 13 and 14 are filled during routine maintenance with bank notes Pa and Pb respectively from the back, that is, from the inside of the staff office. The operator opens the rear door **1*b* to open the rear portion of the housing 1 and also opens the door 12*c*. The first unit 12*a*is disclosed to the staff office. As a result, routine maintenance for the first and second bank note dispensing compartments 13 and 14** is performed only from the inside of the staff office.

On the other hand, if the automatic deposit/withdrawal apparatus is installed against a wall, routine maintenance cannot be performed from the rear side; the bank notes can be filled into the apparatus only from the front side. In this case, the operator opens the rear door **1*b* and draws the bank note dispensing mechanism 12 out of the housing 1. In this case, the first unit 12*a* is turned by 180° with respect to the second unit 12*b*, thereby taking such a position as shown in FIG. 5. Then, the bank note dispensing mechanism 12 is set in the housing 1. In this state, the first and second bank note compartments 13 and 14 are located at the front side of the housing 1, as shown in FIG. 5. This arrangement allows routine maintenance for the compartments 13 and 14 from the front side. The bank note reception station 35 of the second unit 12*b* opposes the second transferring station 30 of the first unit 12***a*. The movable roller 32 of the first transferring station 29*a*, the first guide plate 31 and the tension roller 36 are kept in the second, fourth and sixth positions, respectively. Therefore, when the apparatus is used as the front-operating type, the first and/or second denomination notes Pa and/or Pb taken out of the first and/or second bank note dispensing compartment 13 and/or 14 are conveyed into the second unit 12*b* from the second transferring station 30 through the second opening 30*a* and the third opening 35*a*. The conveying operation within the second unit 12*b* is the same as that of the apparatus when it is used as the rear-operating type.

According to the above-mentioned one embodiment of the present invention, since the first unit 12*a* can be turned back to front with respect to the second unit 12*b*, the most suitable operating mode, that is, a front-operation mode or a rear-operation mode, can be arbitrarily set in accordance with the installation position of the automatic deposit/dispensing apparatus. Therefore, according to the present invention, the bank can install and deploy the apparatus in any location, resulting in low cost and convenience.

Although the manufacturers have been manufacturing apparatus of either front-operating type or rear-operating type, an automatic deposit/withdrawal apparatus according to the present invention eliminates this problem. If a customer orders an apparatus of the front-operating type, the manufacturer merely changes the mounting position of the bank note dispensing compartments. Therefore, speculative production is possible and productivity is thus greatly increased.

What is claimed is:

1. An automatic bank note transaction apparatus comprising:

a housing having a bank note dispensing port and a front door at a front side thereof and a rear door at a rear side thereof;

a first mechanism detachably mounted in said housing through said rear door; and a second mechanism provided in said housing, adjacent to and detachably mounted on said first mechanism and connected to said bank note dispensing port, said first mechanism including:

safe means disposed at one side of the first mechanism for taking out the bank notes therefrom;

transferring means for transferring the bank notes taken out of said safe means; and first conveying means disposed between said safe means and said transferring means for transferring the bank notes taken out of said safe means to said transferring means, said first mechanism being reversible relative to the second mechanism between a first position at which said safe means is near said rear door and a second position at which said safe means is near said front door, and said second mechanism including:

receiving means, opposing said transferring means, for receiving the bank notes from said transferring means; and second conveying means disposed between said receiving means and said bank note dispensing port, for conveying the bank notes received in the receiving means to said bank note dispensing port, whereby at the first position a maintenance operation for the safe means is performed in a condition where the rear door is opened, and at the second position the maintenance operation is performed in a condition where the front door is opened.

2. The apparatus according to claim 1, wherein said bank note dispensing port is disposed above said front door, said second mechanism is disposed on said first mechanism, said transferring means is disposed in an upper part of said first mechanism, and said receiving means is disposed in a lower part of said second mechanism.

3. The apparatus according to claim 2, wherein said first and second mechanisms have a common central axis which is vertical.

4. The apparatus according to claim 3, wherein said receiving means is spaced apart by a predetermined distance from the common central axis.

5. The apparatus according to claim 4, wherein said transferring means has a first transferring station which opposes said receiving means when said first mechanism is kept in the first position, and a second transferring station which opposes said receiving means when said first mechanism is kept in the second position, said first and second transferring stations being spaced apart from each other by the predetermined distance from the common central axis.

* * * * *